T. HOOCK.
SECONDARY WINDING FOR INDUCTION MOTORS.
APPLICATION FILED JUNE 6, 1911.
1,096,243.
Patented May 12, 1914.
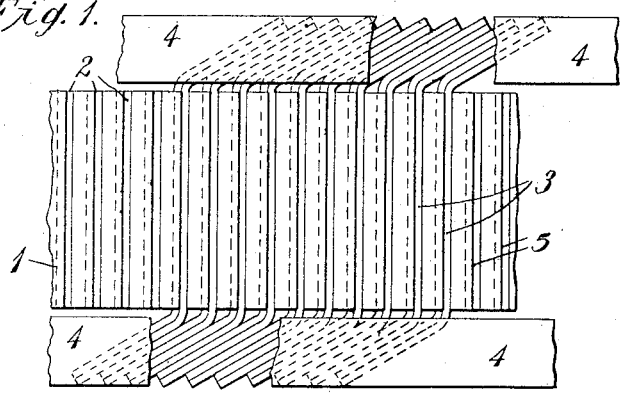
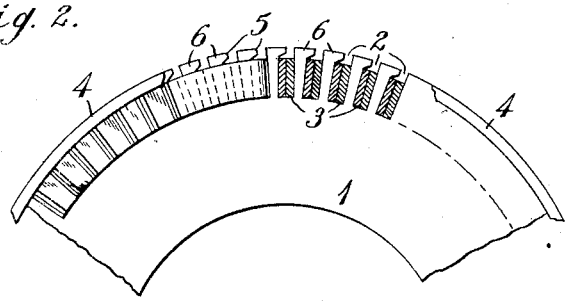
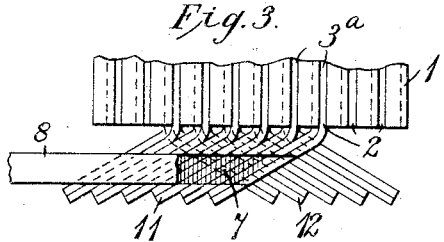
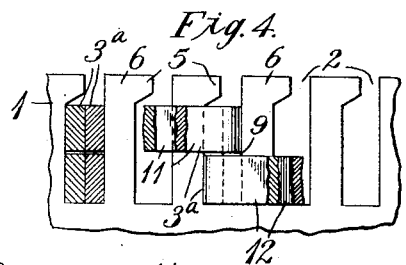
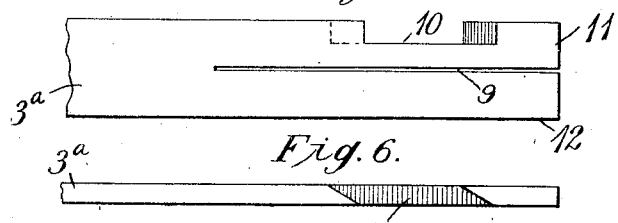
WITNESSES:
Fred H Miller
INVENTOR
Theodor Hoock
BY
Asley G Carr
ATTORNEY

UNITED STATES PATENT OFFICE.

THEODORE HOOCK, OF WILKINSBURG, PENNSYLVANIA. ASSIGNOR TO WESTINGHOUSE ELECTRIC AND MANUFACTURING COMPANY, A CORPORATION OF PENNSYLVANIA.

SECONDARY WINDING FOR INDUCTION-MOTORS.

1,096,243.  Specification of Letters Patent.  Patented May 12, 1914.

Application filed June 6, 1911. Serial No. 631,595.

*To all whom it may concern:*

Be it known that I, THEODORE HOOCK, a subject of the Emperor of Germany, and a resident of Wilkinsburg, in the county of Allegheny and State of Pennsylvania, have invented a new and useful Improvement in Secondary Windings for Induction-Motors, of which the following is a specification.

My invention relates to dynamo-electric machines and particularly to the secondary windings of induction motors.

The object of my invention is to provide a simple and inexpensive and effective secondary winding of the squirrel cage type for induction motors.

Secondary windings for induction motors comprising conducting end rings and a plurality of conducting bars secured to the rings by screws or bolts have been largely used, but the necessarily large number of tapped holes renders a winding of this type relatively expensive.

By my present invention, I provide a winding of the general character indicated above which possesses the advantages of the windings heretofore used without entailing the usual amount of labor and expense.

Figure 1 of the accompanying drawings is a plan view of a portion of an induction motor rotor having a winding constructed and arranged in accordance with my invention and Fig. 2 is an end elevation, partially in section, of the parts shown in Fig. 1. Fig. 3 is a fragmentary view, corresponding to Fig. 1, of a slightly modified structure embodying my invention, and Figs. 4, 5 and 6 are detail views, on a larger scale, of the bars shown in Fig. 3.

Referring to Figs. 1 and 2 of the drawings, a core member 1 having a plurality of peripheral slots 2, is provided with a winding of the squirrel cage type, comprising a plurality of bars 3 of conducting material, two of which are preferably located in each of the slots 2, and end connecting rings 4. Each slot 2 is partially closed by a projection 5 at one side of an adjacent core tooth 6, and the bars 3 are so proportioned that one of them may be inserted directly into each of the slots, moved laterally under the projection 5, and a second bar placed in position beside the first to completely fill the slot below the projection, as shown in Fig. 2 of the drawings. The ends of the bars 3 are bent laterally in opposite directions, as shown in Fig. 1, so that they constitute a continuous end ring. In order to improve the conductivity of the engaging end portions of the bars, they may be soldered together and they are held in place, even when the rotor, of which they are parts, is operating at high speeds, by means of the rings 4 which are preferably shrunk into position upon said end portions. The rings 4 may be so combined with the ends of the bars 3 as to connect them electrically and reinforce them mechanically or they may provide only mechanical reinforcement, as may be desired.

The ends of the bars 3, instead of being bent laterally in opposite direction, may, of course, be bent laterally in the same direction and, in fact, it may be found preferable to bifurcate the ends of the bars and bend the two parts at each end laterally in opposite directions, as shown in Figs. 3 to 6, to which reference may now be had.

The ends of the bars 3ª may be provided with notches to produce annular grooves 7 in which suitably proportioned rings 8 (only one of which is shown) may be located in order to overcome the tendency for the bars to straighten after they are bent. Each of the bars 3ª is provided with a slot or saw cut 9 and a notch 10 at each end. After the bars are located in the core slots and their ends 11 and 12 are bent laterally in opposite directions, the rings 8 are shrunk into the grooves 7, formed by the notches 10, to securely hold the winding in position.

My invention is not restricted to the specific details illustrated in the drawings and I desire that only such limitations shall be imposed as are indicated in the appended claims.

I claim as my invention:

1. The combination with a slotted core, of a winding comprising spaced parallel conducting bars disposed in the core slots, the ends of which are alike and are bent laterally and uniformly into engagement with each other to form a ring the laminæ of which are angularly disposed with reference to the core ends.

2. A winding for dynamo-electric machines comprising conducting bars the ends of which are alike and are bent laterally and uniformly in opposite directions to such degree only as will effect engagement with each other to constitute continuous conducting end members.

3. A secondary squirrel-cage winding for induction motors comprising parallel spaced conducting bars the end portions of which are alike and are bent laterally and uniformly to such degree only as will effect engagement with each other and soldered together to constitute conducting end rings.

4. A secondary member for induction motors comprising a substantially cylindrical core member having peripheral slots and conducting bars disposed in said slots the end portions of which are alike and extend beyond the ends of the slots and are bent laterally and uniformly to such degree only as to effect engagement with each other and soldered to constitute conducting end rings.

5. A secondary member for induction motors comprising a substantially cylindrical core member having peripheral slots, conducting bars disposed in said slots the end portions of which are alike and extend beyond the ends of the slots and are bent laterally and uniformly in opposite directions to such degree only as to effect engagement with each other, and binding rings shrunk upon the end portions to hold the bars in position in the slots.

6. A secondary member for induction motors comprising a substantially cylindrical core member having peripheral slots and conducting bars disposed in said slots and each having bifurcated end portions extending beyond the ends of the slots, the parts of each end portion being bent laterally in opposite directions into engagement with corresponding parts of adjacent bars to constitute conducting end rings.

7. A secondary member for induction motors comprising a substantially cylindrical core member having peripheral slots, conducting bars disposed in said slots and each having bifurcated end portions extending beyond the ends of the slots, the parts of each end portion being bent laterally in opposite directions into engagement with adjacent bars, and binding rings shrunk upon the end portions to hold the bars in position in the slots.

8. A secondary member for induction motors comprising a substantially cylindrical core member having peripheral slots, conducting bars disposed in said slots and each having end portions extending beyond the ends of the slots, and bent laterally in opposite directions into engagement with each other, and binding rings shrunk into slots in the end portions to hold the bars in position.

In testimony whereof, I have hereunto subscribed my name this 23rd day of May, 1911.

THEODORE HOOCK.

Witnesses:
B. B. HINES,
M. CLARA EBERZ.